T. B. James,
Inside Blinds,
N°. 68,751.  Patented Sep. 10, 1867.
Fig: 1.
Fig: 2.
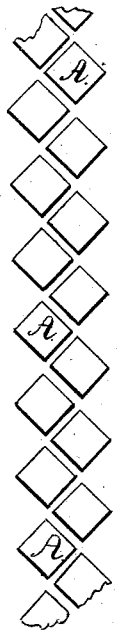
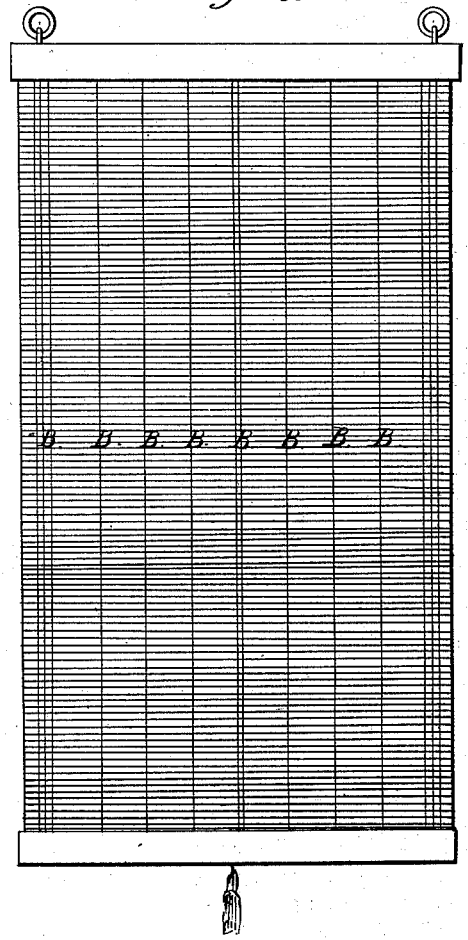
Witnesses
Inventor.

United States Patent Office.

T. B. JAMES, OF MUSCATINE CITY, IOWA.

Letters Patent No. 68,751, dated September 10, 1867.

IMPROVED WINDOW-SHADE.

*The Schedule referred to in these Letters Patent and making part of the same.*

TO ALL WHOM IT MAY CONCERN:

Be it known that I, T. B. JAMES, of Muscatine, in the county of Muscatine, and State of Iowa, have invented a new and useful improvement in Window-Shades; and I do hereby declare that the following is a full, clear, and exact description of the same, reference being had to the annexed drawings, making part of this specification, in which—

Figure 1 is a vertical section, and

Figure 2 is a front elevation.

The same letters are employed in both figures in the indication of identical parts.

Window-shades have been made of flat strips woven together, also of round sticks placed so as to be arranged in double order, one covering the joint between the two in the opposite row. The single shades are subject to the objection that the spaces between them permit the transmission of horizontal lines of light, while the round sticks, in double arrangement, exclude both light and air.

My improvement consists in the use of square or lozenge-formed sticks placed in double order, and woven together in such manner that while the passage of horizontal rays is prevented, light and air may pass through inclined spaces between the sticks. In the annexed drawings—

A A are the sticks, represented as square prisms. These sticks are arranged in two rows, so placed that each one shall have one of its angles opposite the space between the two adjoining sticks in the other row. The sticks thus disposed are woven together by strings, as at B. It will be observed that while horizontal rays are excluded, and it is impossible to see through the blind, both light and heat may be admitted through the inclined spaces between the sticks.

What I claim as my invention, and desire to secure by Letters Patent, is—

Constructing window-shades with quadrilateral prismatic sticks A, arranged and woven together substantially as set forth.

In testimony whereof I have signed my name to this specification in the presence of two subscribing witnesses.

T. B. JAMES.

Witnesses:
   JNO. H. MUNROE,
   PLINY FAY.